(12) United States Patent
Yang

(10) Patent No.: US 8,474,344 B1
(45) Date of Patent: Jul. 2, 2013

(54) CONTROLLABLE COMPOSITE CLUTCH HAVING LIMITED TORQUE WHILE BEING IN RELEASED STATE

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/444,068

(22) Filed: Apr. 11, 2012

(51) Int. Cl.
*F16H 59/00* (2006.01)

(52) U.S. Cl.
USPC .......................................................... 74/335

(58) Field of Classification Search
USPC ............................ 74/330, 331, 333, 340, 335
See application file for complete search history.

(56) References Cited

U.S. PATENT DOCUMENTS

| | | | |
|---|---|---|---|
| 6,766,705 B1 * | 7/2004 | Hall, III | 74/331 |
| 7,077,024 B2 * | 7/2006 | Lauri et al. | 74/325 |
| 8,066,606 B2 * | 11/2011 | Dittrich et al. | 475/218 |
| 8,146,451 B2 * | 4/2012 | Van Druten et al. | 74/330 |

* cited by examiner

*Primary Examiner* — Ha D Ho
(74) *Attorney, Agent, or Firm* — Bacon & Thomas, PLLC

(57) ABSTRACT

A controllable composite clutch device limited torque while in a released state includes a clutch capable of being controlled for performing engaging/releasing function and a limited torque device having relatively smaller torque installed between an input/output shaft and an output shaft, or radially installed between an input shaft and a cylindrical outputting rotation part, so that when the clutch is controlled to be in an engaged state, the rotary kinetic energy between the input shaft and the output shaft is transferred through the clutch, and so that when the clutch is controlled to be in a released state, the limited torque device performs limited torque coupling and the rotary kinetic energy between the input shaft and the output shaft can continue to be transferred, or a slip rotational speed differential is generated due to over-torque.

11 Claims, 2 Drawing Sheets

US 8,474,344 B1

CONTROLLABLE COMPOSITE CLUTCH HAVING LIMITED TORQUE WHILE BEING IN RELEASED STATE

BACKGROUND OF THE INVENTION (a) Field of the Invention

The present invention relates to a controllable composite clutch having limited torque while being in a released state, wherein when the clutch is released from an engaging transmission state, a physical limited torque smaller than the engaging torque can still be provided for application.

(b) Description of the Prior Art

A conventional controllable clutch is only equipped with a transmission switch function of engaging or releasing, thus very little function can be provided.

SUMMARY OF THE INVENTION

The present invention provides a controllable composite clutch having limited torque while being in a released state, in which a clutch capable of being controlled for performing engaging/releasing function and a physical limited torque device having relatively smaller torque being axially installed between an input/output shaft and an output shaft, or being radially installed between an input shaft and a cylindrical outputting rotation part; so when the clutch is controlled to be in an engaged state, the rotary kinetic energy between the input shaft and the output shaft is transferred through the clutch; when the clutch is controlled to be in a released state, the physical limited torque device performs limited torque coupling, such that the rotary kinetic energy between the input shaft and the output shaft can continue to be transferred or the slip rotational speed differential is generated due to over-torque; the mentioned physical limited torque is smaller than the engaging torque of the clutch.

DESCRIPTION OF MAIN COMPONENT SYMBOLS

Figure 1:
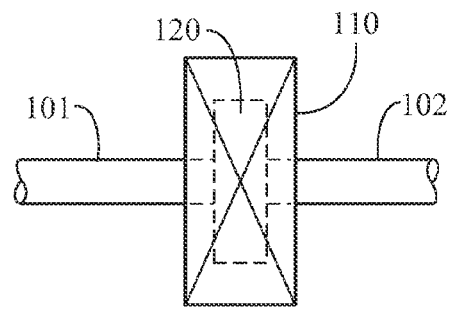
FIG. 1 is a schematic view showing the axial type composite structure, according to the present invention.

101-201: Input shaft
102: Output shaft
111: Relay input shaft
112: Relay output shaft
110: Axial clutch
120: Limited torque device
113: Active end transmission
114: Passive end transmission
202: Cylindrical outputting rotation part
207-208: Bearing
210: Radial clutch
220: Radial limited torque device

DETAILED DESCRIPTION OF THE PREFERRED EMBODIMENTS

A conventional controllable clutch is only equipped with a transmission switch function of engaging or releasing, thus very little function can be provided.

The present invention provides a controllable composite clutch having limited torque while being in a released state, in which a clutch capable of being controlled for performing engaging/releasing function and a physical limited torque device having smaller torque being axially installed between an input/output shaft and an output shaft, or being radially installed between an input shaft and a cylindrical outputting rotation part; so when the clutch is controlled to be in an engaged state, the rotary kinetic energy between the input shaft and the output shaft is transferred through the clutch; when the clutch is controlled to be in a released state, the physical limited torque device performs limited torque coupling, such that the rotary kinetic energy between the input shaft and the output shaft is continued to be input or the slip rotational speed differential being generated due to over-torque can be carried out by smaller torque; the physical limited torque of the mentioned limited torque device (120) is smaller than the engaging torque of the clutch.

FIG. 1 is a schematic view showing the axial type composite structure, according to the present invention;

As shown in FIG. 1, it mainly consists of:

input shaft (101): constituted by a shaft or rotary structure capable of inputting the rotary kinetic energy, and served to be combined at the input end of the axial clutch (110) and at the input end of the limited torque device (120);

output shaft (102): constituted by a shaft or rotary structure capable of outputting the rotary kinetic energy, and served to be combined at the output end of the axial clutch (110) and at the output end of the limited torque device (120);

axial clutch (110): controlled by manual force or centrifugal force, or controlled by the electric force, and/or magnetic force, and/or mechanical force, and/or air pressure and/or hydraulic force; when being in an engaged state, the axial clutch (110) is served to transfer the rotary kinetic energy between the input shaft (101) and the output shaft (102), and when the axial clutch (110) being in a released state, served to terminate the transmission of the rotary kinetic energy between the input shaft (101) and the output shaft (102)

limited torque device (120): controlled by manual force or centrifugal force, or controlled by the electric force, and/or magnetic force, and/or mechanical force, and/or air pressure and/or hydraulic force, equipped with the characteristic of limited torque, wherein the limited torque coupling is performed by the physical limited torque device, such that the rotary kinetic energy between the input shaft (101) and the output shaft (102) can be transferred through smaller torque, or the slip rotational speed differential between the input shaft (101) and the output shaft (102) is generated due to over-torque; the mentioned physical limited torque is smaller than the engaging torque of the axial clutch (110);

When being applied, the inputting and the outputting function of the mentioned input shaft (101) and the output shaft (102) can be switched to input the rotary kinetic energy through the output shaft (102) and output the rotary kinetic energy from the input shaft (101).

Figure 2:
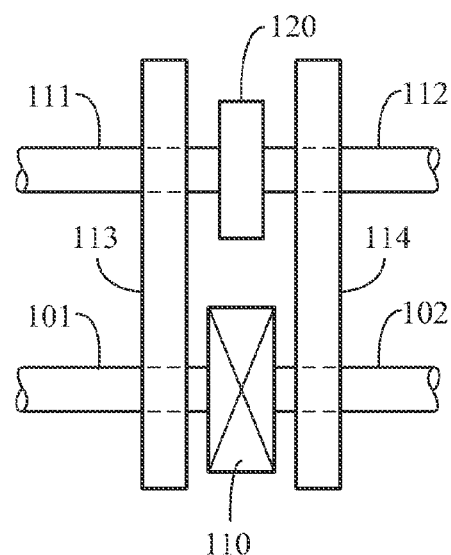
FIG. 2 is a schematic view showing the multi-shaft connecting type composite structure, according to the present invention.

According to the controllable composite clutch having limited torque while being in a released state provided by the present invention, a multi-shaft parallel-connected transmission structure having the same function can be adopted, thereby meeting the requirement of the applied space;

FIG. 2 is a schematic view showing the multi-shaft connecting type composite structure, according to the present invention;

As shown in FIG. 2, two transmission ends of the axial clutch (110) are respectively combined with the input shaft (101) and the output shaft (102), and two transmission ends of the limited toque device (120) are respectively combined with the relay input shaft (111) and the relay output shaft (112); the rotary kinetic energy between the input shaft (101) and the relay input shaft (111) is transferred through the active end transmission (113), and the rotary kinetic energy between the output shaft (102) and the relay output shaft (112) is transferred through the passive end transmission (114), wherein the input shaft (101) revolves in the same rotating direction relative to the output shaft (102), the relay input shaft (111) revolves in the same rotating direction relative to the relay output shaft (112), the speed ratio between the input shaft (101) and the relay input shaft (111) and the speed ratio between the output shaft (102) and the relay output shaft (112) are the same, and the speed ratio between the input shaft (101) and the relay input shaft (111) and the output shaft (102) and the relay output shaft (112) can be determined according to actual needs.

When being applied, the inputting and the outputting function of the mentioned input shaft (101) and the output shaft (102) can be switched to input the rotary kinetic energy through the output shaft (102) and output the rotary kinetic energy from the input shaft (101).

Figure 3:
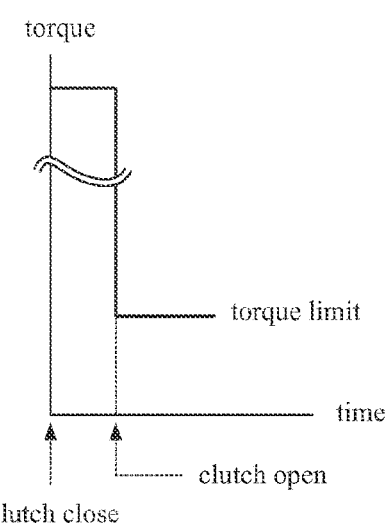
FIG. 3 is a schematic view illustrating the operation characteristic of the limited torque being set as a fixed torque, according to the present invention.
Figure 4:
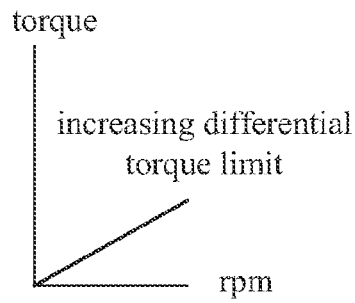
FIG. 4 is a schematic view illustrating the operation characteristic of the limited torque being gradually increased while the rotation differential being increased, according to the present invention.
Figure 5:
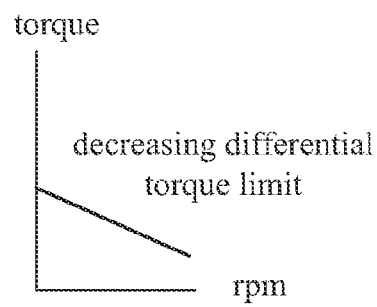
FIG. 5 is a schematic view illustrating the operation characteristic of the limited torque being gradually reduced while the rotation differential being increased, according to the present invention.

The mentioned limited torque device (120) shown in FIG. 1 and FIG. 2 is equipped with one or more than one of the following characteristics:

(1) a limited torque device having the set torque, e.g. configured by a pre-stressed limited torque structure; FIG. 3 is a schematic view illustrating the operation characteristic of the limited torque being set as a fixed torque, according to the present invention;

(2) a limited torque device having the gradually-increased torque while the rotation differential being increased, e.g. configured by an eddy current coupling device or viscous oil coupling device; FIG. 4 is a schematic view illustrating the operation characteristic of the limited torque being gradually increased while the rotation differential being increased, according to the present invention;

(3) a limited torque device having the gradually-reduced torque while the rotation differential being increased, e.g. configured by a sliding friction disc or hydraulic coupling device; FIG. 5 is a schematic view illustrating the operation characteristic of the limited torque being gradually reduced while the rotation differential being increased, according to the present invention.

Figure 6:
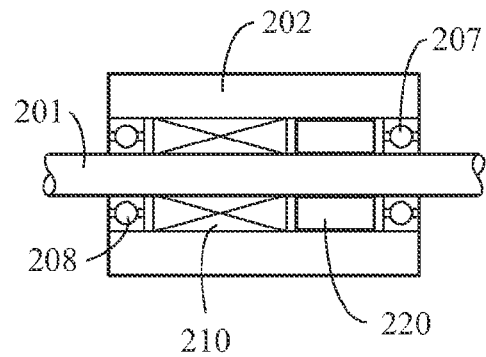
FIG. 6 is a schematic view showing the radial type composite structure, according to the present invention.

According to the controllable composite clutch having limited torque while being in a released state provided by the present invention, a radial composite structure can be adopted, thereby meeting the requirement of the applied space;

FIG. 6 is a schematic view showing the radial type composite structure, according to the present invention;

As shown in FIG. 6, it mainly consists of:

input shaft (201): constituted by a shaft or rotary structure capable of inputting the rotary kinetic energy, and served to be combined at the inner circular input end of the radial clutch (210) and at the inner circular input end of the radial limited torque device (220);

cylindrical outputting rotation part (202): constituted by a cylindrical rotary structure capable of outputting the rotary kinetic energy, and served to be combined at the output end of the radial clutch (210) and at the output end of the radial limited torque device (220);

radial clutch (210): controlled by manual force or centrifugal force, or controlled by the electric force, and/or magnetic force, and/or mechanical force, and/or air pressure and/or hydraulic force; when being in an engaged state, the radial clutch (210) is served to transfer the rotary kinetic energy between the input shaft (201) and the cylindrical outputting rotation part (202), and when the radial clutch (210) being in a released state, served to terminate the transmission of the rotary kinetic energy between the input shaft (201) and the cylindrical outputting rotation part (202);

radial limited torque device (220): controlled by manual force or centrifugal force, or controlled by the electric force, and/or magnetic force, and/or mechanical force, and/or air pressure and/or hydraulic force, equipped with the characteristic of limited torque, wherein the limited torque coupling is performed by the physical limited torque device, such that the rotary kinetic energy between the input shaft (201) and the cylindrical outputting rotation part (202) can be transferred through smaller torque, or the slip rotational speed differential between the input shaft (201) and the cylindrical outputting rotation part (202) is generated due to over-torque; the physical limited torque of the mentioned radial limited torque device (220) is smaller than the engaging torque of the radial clutch (210);

When being applied, the inputting and the outputting function of the mentioned input shaft (201) and the cylindrical outputting rotation part (202) can be switched to input the rotary kinetic energy through the cylindrical outputting rotation part (202) and output the rotary kinetic energy from the input shaft (201).

The mentioned radial limited torque device (220) shown in FIG. 6 is equipped with one or more than one of the following characteristics:

(1) a limited torque device having the set torque, e.g. configured by a pre-stressed limited torque structure; FIG. 3 is a schematic view illustrating the operation characteristic of the limited torque being set as a fixed torque, according to the present invention;

(2) a limited torque device having the gradually-increased torque while the rotation differential being increased, e.g. configured by an eddy current coupling device or viscous oil coupling device; FIG. 4 is a schematic view illustrating the operation characteristic of the limited torque being gradually increased while the rotation differential being increased, according to the present invention;

(3) a limited torque device having the gradually-reduced torque while the rotation differential being increased, e.g. configured by a sliding friction disc or hydraulic coupling device; FIG. 5 is a schematic view illustrating the operation characteristic of the limited torque being gradually reduced while the rotation differential being increased, according to the present invention.

The invention claimed is:

1. A controllable composite clutch device having limited torque while in a released state comprises a clutch (110 or 210) capable of being controlled for performing engaging/releasing function and a limited torque device (120 or 220) installed between an input shaft (101 or 201) and an output shaft (102) or cylindrical output part (202), so that when the clutch (110 or 210) is controlled to be in an engaged state, rotary kinetic energy between the input shaft (101 or 201) and the output shaft (102) or cylindrical output part (202) is transferred through the clutch (110 or 210) and when the clutch (110 or 210) is controlled to be in a released state, the limited torque device (120 or 220) performs limited torque coupling, wherein continued input of the rotary kinetic energy between the input shaft (101 or 201) and the output shaft (102) or cylindrical output part (202) or a slip rotational speed differential generated due to over-torque is carried out by smaller torque, a limited torque of the limited torque device (120 or 220) being smaller than an engaging torque of the clutch (110 or 210) wherein:

input shaft (101 or 201) is constituted by a shaft or rotary structure capable of inputting the rotary kinetic energy, and coupled to an input end of the axial clutch (110 or 210) and to an input end of the limited torque device (120 or 220);

output shaft (102) or cylindrical output part (202) is constituted by a shaft or rotary structure capable of outputting the rotary kinetic energy, and respectively coupled to an output end of the axial clutch (110 or 210) and to an output end of the limited torque device (120 or 220);

axial clutch (110 or 210) is controlled by manual force, centrifugal force, electric force, magnetic force, mechanical force, air pressure, and/or hydraulic force to transfer the rotary kinetic energy between the input shaft (101 or 201) and the output shaft (102) or cylindrical output part (202) when the axial clutch (110 or 210) is the engaged state, and to terminate the transmission of the rotary kinetic energy between the input shaft (101 or 201) and the output shaft (102) or cylindrical output part (202) when the axial clutch (110 or 210) is in the released state;

limited torque device (120 or 220) is controlled by manual force, centrifugal force, electric force, magnetic force, mechanical force, air pressure, and/or hydraulic force to perform said limited torque coupling; and an inputting and an outputting function of the input shaft (101 or 201) and the output shaft (102) or cylindrical output part (202) can be switched to input the rotary kinetic energy through the output shaft (102) or cylindrical output part (202) and output the rotary kinetic energy from the input shaft (101 or 201).

2. A controllable composite clutch device having limited torque while in a released state as claimed in claim 1, further comprising a multi-shaft parallel-connected transmission structure, wherein two transmission ends of the axial clutch (110) are respectively combined with the input shaft (101) and the output shaft (102), and two transmission ends of the limited torque device (120) are respectively combined with a relay input shaft (111) and a relay output shaft (112), wherein rotary kinetic energy is transferred between the input shaft (101) and the relay input shaft (111) through an active end transmission (113), and rotary kinetic energy is transferred between the output shaft (102) and the relay output shaft (112) a passive end transmission (114), wherein the input shaft (101) revolves in a same rotating direction relative to the output shaft (102), the relay input shaft (111) revolves in a same rotating direction relative to the relay output shaft (112), wherein a speed ratio between the input shaft (101) and the relay input shaft (111) and a speed ratio between the output shaft (102) and the relay output shaft (112) are the same, and wherein a speed ratio between the input shaft (101) and the relay input shaft (111) and the output shaft (102) and the relay output shaft (112) is determined according to actual needs.

3. A controllable composite clutch device having limited torque while in a released state as claimed in claim 1 or 2, wherein the limited torque device (120 or 220) has one or more of the following characteristics:
   1) a set torque;
   2) a torque that gradually increases while a rotation differential is increased;
   3) a torque that gradually decreases while a rotation differential is increased.

4. A controllable composite clutch device having limited torque while being in released state as claimed in claim 1, the controllable composite clutch device having a radial type composite structure, wherein:

the clutch (210) is a radial clutch, the limited torque device (220) is a radial limited torque device, and the input shaft (201) is combined at an inner circular input end of the radial clutch (210) and at an inner circular input end of the radial limited torque device (220); and cylindrical output part (202) is a cylindrical rotary structure combined at the output end of the radial clutch (210) and at the output end of the radial limited torque device (220).

5. A controllable composite clutch device having limited torque while in a released state as claimed in claim 4, wherein the limited torque device (220) has one or more of the following characteristics:
   1) a set torque;
   2) a torque that gradually increases while a rotation differential is increased;
   3) a torque that gradually decreases while a rotation differential is increased.

6. A controllable composite clutch device having limited torque while in a released state as claimed in claim 3, wherein the limited torque device (120 or 220) has a set torque provided by a pre-stressed limited torque structure.

7. A controllable composite clutch device having limited torque while in a released state as claimed in claim 3, wherein the limited torque device (120 or 220) has a torque that gradually increases while the rotation differential increases, said gradually increasing torque being provided by an eddy current or viscous oil coupling device.

8. A controllable composite clutch device having limited torque while in a released state as claimed in claim 3, wherein the limited torque device (120 or 220) has a torque that gradually decreases while the rotation differential increases, said gradually decreasing torque being provided by a sliding friction disc or hydraulic coupling device.

9. A controllable composite clutch device having limited torque while in a released state as claimed in claim 5, wherein the limited torque device (220) has a set torque provided by a pre-stressed limited torque structure.

10. A controllable composite clutch device having limited torque while in a released state as claimed in claim 5, wherein the limited torque device (220) has a torque that gradually increases while the rotation differential increases, said gradually increasing torque being provided by an eddy current or viscous oil coupling device.

11. A controllable composite clutch device having limited torque while in a released state as claimed in claim 5, wherein the limited torque device (220) has a torque that gradually decreases while the rotation differential increases, said gradually decreasing torque being provided by a sliding friction disc or hydraulic coupling device.

\* \* \* \* \*